May 30, 1933.  W. FERRIS ET AL  1,912,184
HYDRAULIC MOTOR CONTROL
Filed June 28, 1930   3 Sheets-Sheet 2
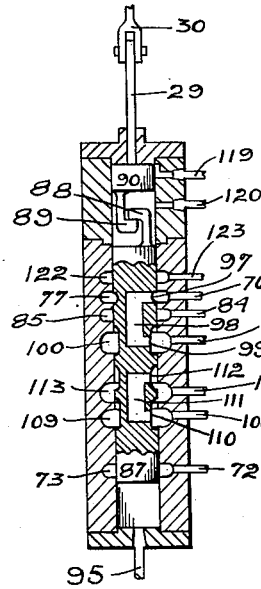
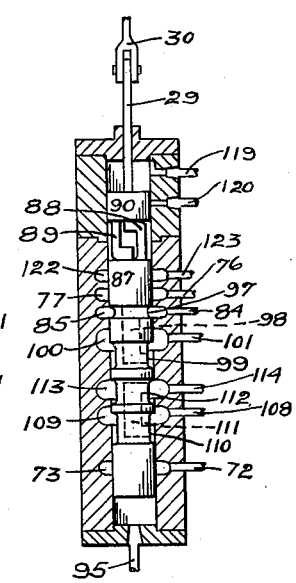
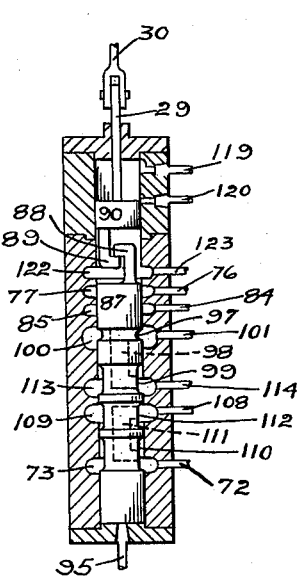
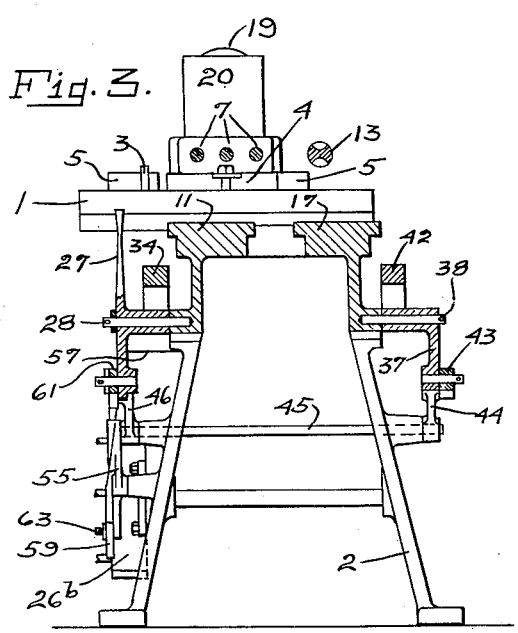
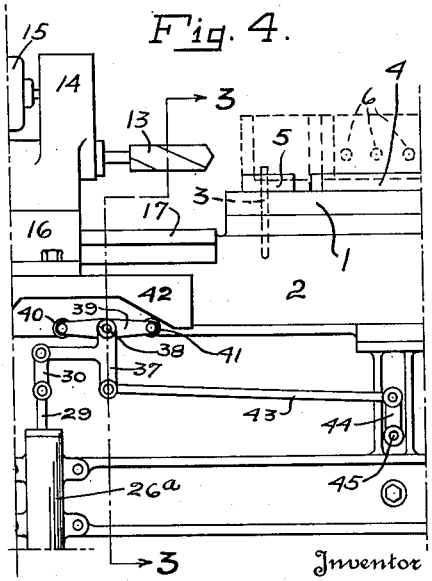
Inventor
WALTER FERRIS.
GLEN MACOMBER.
By
Attorney

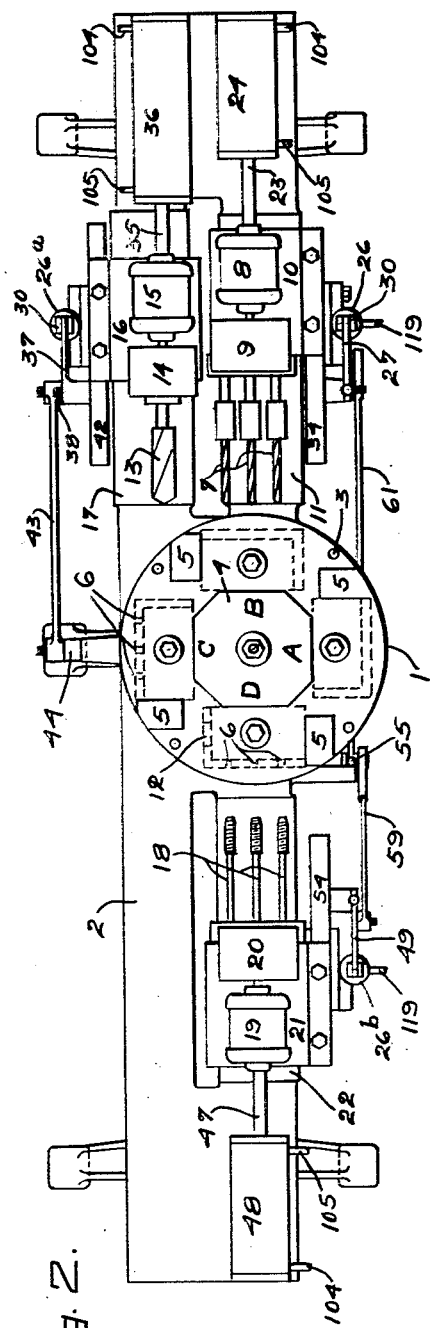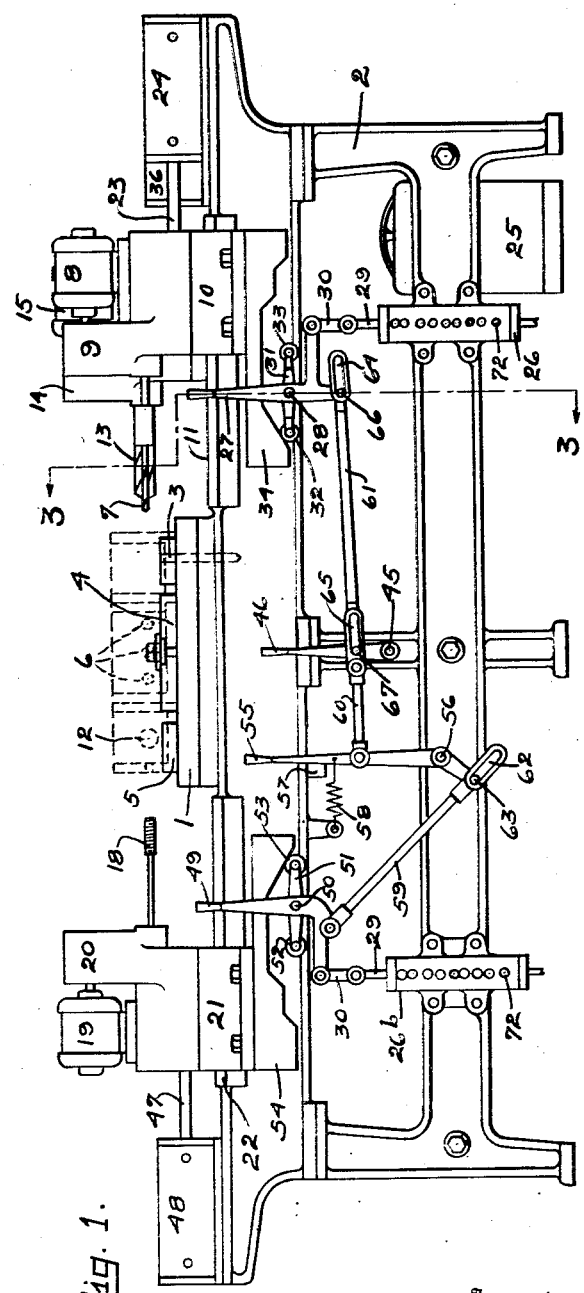

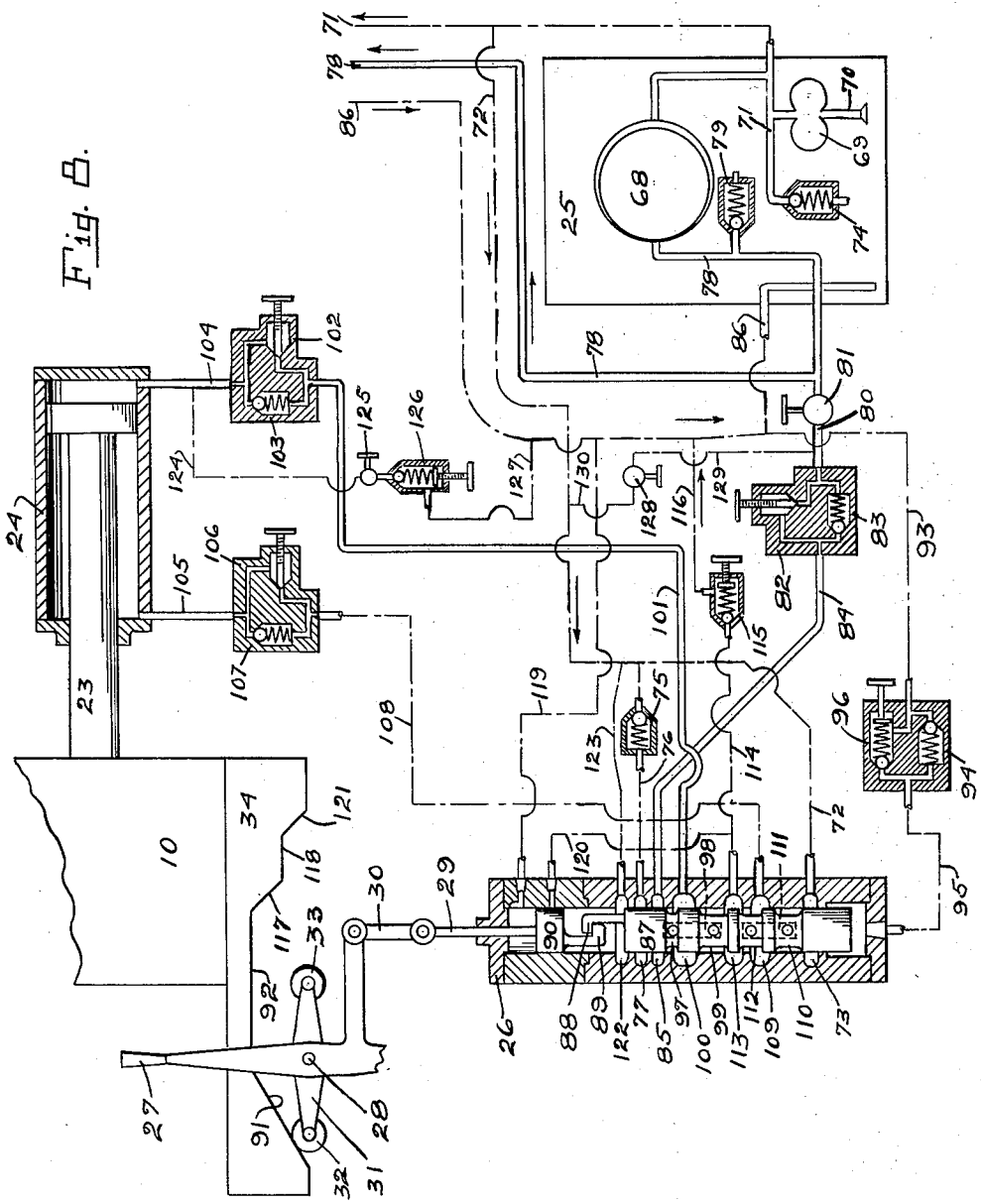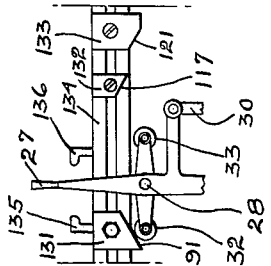

Patented May 30, 1933

1,912,184

UNITED STATES PATENT OFFICE

WALTER FERRIS, OF MILWAUKEE, AND GLEN MACOMBER, OF WAUKESHA, WISCONSIN, ASSIGNORS TO THE OILGEAR COMPANY, OF MILWAUKEE, WISCONSIN, A CORPORATION OF WISCONSIN

HYDRAULIC MOTOR CONTROL

Application filed June 28, 1930. Serial No. 464,452.

This invention relates to controls for hydraulic motors and is particularly adapted to machines having a number of tool or work carriers which are operated by hydraulic motors.

An object of the invention is to provide a control which will enable two or more hydraulic motors or other hydraulic apparatus to be operated at full efficiency when supplied with liquid from a common source.

Another object is to supply liquid from a common source to two or more hydraulic motors and to operate the motors either separately or simultaneously without the operation of one affecting the operation of the other.

The hydraulic feed is particularly adapted for multiple drilling machines but the invention is not limited to this particular type of machine.

A drilling machine in which the invention is embodied is illustrated in the accompanying drawings in which the views are as follows:

Fig. 1 is an elevation of the machine.

Fig. 2 is a top plan view thereof.

Fig. 3 is a transverse section taken on the lines 3—3 of Figs. 1 and 4.

Fig. 4 is an elevation showing the control mechanism upon the rear side of the machine.

Figs. 5, 6 and 7 are longitudinal sections through a control valve, showing the plunger thereof in various operative positions.

Fig. 8 is a schematic drawing of the hydraulic circuit.

Fig. 9 is a detail of a modified form of control.

The drilling machine selected for illustration is adapted to perform three operations simultaneously upon work carried by a turret 1 which is arranged upon the frame 2 of the machine and held in selected positions by a pin 3. and the work selected for illustration is to have holes drilled in two different faces thereof and the holes in one face are to be threaded.

The turret 1 is provided with stops 4 and 5 for positioning a piece of work at each of four stations A, B, C and D and with suitable clamping means for securing the work in position. The work is moved from station to station by removing the pin 3, rotating the turret 90° and then re-inserting the pin to hold the turret in that position.

The holes 6 in one face of the work are drilled at station B by a gang of drills 7 which are driven by an electric motor 8 through a transmission 9; and the motor, transmission and drills are all carried by a tool carriage 10 which is movable longitudinally of the frame 2 upon a guideway 11 carried thereby.

The hole 12 in the other face is drilled at station C by a drill 13 which is driven through a transmission 14 from an electric motor 15, and the drill, motor and transmission are all carried by a tool carriage 16 which is movable longitudinally of the frame 2 upon a guideway 17 carried thereby.

The holes 6 are threaded at station D by a gang of taps 18 which are driven from an electric motor 19 through a transmission 20, and the taps, transmission and motor are all carried by a tool carriage 21 which is movable longitudinally of the frame 2 upon a guideway 22 carried thereby.

The tool carriage 10 is connected to the piston 23 of a hydraulic motor 24 which is secured to the top of the frame 2 and operated by liquid supplied from a pump unit 25 through a control valve 26 which is arranged upon the front of the frame 2 to control the operation of the motor 24.

The valve 26 is operated by an angular hand lever 27 which is carried by the frame 2 upon a pivot 28 and has one of its arms connected to an actuating stem 29 of the valve 26 by a link 30.

The lever 27 has a cam lever 31 fixed for rotation therewith upon the pivot 28 and provided at its ends with cam rollers 32 and 33 for engagement with a cam 34 carried by the carriage 10.

The tool carriage 16 is connected to the piston 35 of a hydraulic motor 36 which is secured to the top of the frame 2 and operated by liquid supplied from the pump unit 25 through a control valve 26ᵃ which is arranged upon the rear side of the frame 2 to control the operation of the motor 36.

The valve 26ᵃ is operated by an angular lever 37 which is carried by the frame 2 upon a pivot 38 and has one of its arms connected to the actuating stem 29 of the valve 26ª by a link 30.

The lever 37 has a cam lever 39 fixed for rotation therewith upon the pivot 38 and provided upon its ends with cam rollers 40 and 41 for engagement with a cam 42 carried by the carriage 16.

In order that the lever 37 may be operated from the front of the machine, its lower end is connected by a rod 43 to a crank arm 44 secured upon the rear end of a shaft 45 which is journaled in the frame 2 and provided upon its front end with a hand lever 46.

The tool carriage 21 is connected to the piston 47 of a hydraulic motor 48 which is secured to the top of the frame 2 and operated by liquid supplied from the pump unit 25 through a control valve 26ᵇ which is arranged upon the front of the frame 2 to control the operation of the motor 48.

The valve 26ᵇ is operated by an angular hand lever 49 which is carried by the frame 2 upon a pivot 50 and one of its arms is connected to the actuating stem 29 of the valve 26ᵇ by a link 30.

The lever 49 has a cam lever 51 fixed for rotation therewith upon the pivot 50 and provided at its ends with cam rollers 52 and 53 for engagement with a cam 54 carried by the carriage 21.

The carriages 10, 16 and 21 may be advanced individually by operating the levers 27, 46 and 49, or the carriages may be advanced simultaneously by operating a hand lever 55 which is pivoted to the frame 2 by a pivot 56, urged to its neutral position against a stop 57 by a spring 58, and connected by suitable linkage to the levers 27, 46 and 49.

The lever 55 is connected to the lever 49 by a link 59, and to the levers 27 and 46 by a link 60 and a connecting rod 61. The link 59 has one end pivoted to the lever 49 and its other end is provided with a slot 62 to receive a pin 63 carried by the lower end of the lever 55. The connecting rod 61 is connected to the lever 55 by the link 60 and is provided at its ends with slots 64 and 65 to receive, respectively, a pin 66 carried by the lever 27 and a pin 67 carried by the lever 46.

If the carriage 10 is to be advanced individually, the handle of the lever 27 is swung toward the center of the machine and the pin 66 moves along the slot 64 without moving the connecting rod 61.

If the carriage 16 is to be advanced individually, the handle of the lever 46 is moved toward the carriage 10 and the pin 67 moves along the slot 65 without moving the connecting rod 61.

If the carriage 21 is to be advanced, the handle of the lever 49 is moved toward the center of the machine and the slot 62 enables the link 59 to be moved axially without moving the lever 55.

If the carriages are to be advanced simultaneously, the handle of the lever 55 is moved toward the center of the machine, the ends of the slots 64 and 65 engage the pins 66 and 67 to operate the levers 27 and 46 and the pin 63 engages the end of the slot 62 to move the link 59 and operate the lever 49.

After the levers 27, 46 and 49 have been operated, the lever 55 may be released and the spring 58 will retract it against the stop 57 as the pin 63 may move freely in the slot 62 without affecting the lever 49.

The carriages 10, 16 and 27 operate and are controlled in exactly the same manner, the valves 26, 26ª and 26ᵇ are exactly alike, the cam levers 31, 39 and 51 are similar, the cams 34, 42 and 54 differ only in the location and lengths of the cam faces, and the hydraulic circuits of the three motors are substantially the same, consequently, only the circuit of the motor 24 has been illustrated and described.

The pump unit 25 is a well known type which has a high pressure pump 68 of limited capacity and a low pressure pump 69 of larger capacity arranged in the same casing. The pump 68, preferably, is capable of automatically varying the volume of its output from substantially zero to its full volumetric capacity. The pump 69 is ordinarily a gear pump which is employed to supercharge the pump 68 and to provide a relatively large volume of liquid for any use wherein a high pressure is not required. A pump unit which may be employed is disclosed in Patent No. 1,619,200, issued March 1, 1927, to Walter Ferris, and which may be provided with an automatic delivery control as disclosed in Patent No. 1,578,233, issued March 23, 1926, to Walter Ferris.

The large low-pressure pump 69 draws liquid from the sump of the pump unit 25 through a suction pipe 70 and delivers its output through a pipe 71 which is connected to the intake of the pump 68 and is also connected by a pipe 72 to an annular port 73 in the valve 26. The maximum pressure at which the liquid will be delivered is determined by the resistance of a low pressure relief valve 74 which is connected to the pipe 71 and discharges into the sump of the pump unit 25. The pipe 72 is also connected through a check valve 75 and a pipe 76 to an annular port 77 in the valve 26.

The pump 68 delivers liquid into a high pressure delivery pipe 78, and a high pressure relief valve 79 is connected into the pipe 78 and discharges into the sump of the pump unit 25 to limit the maximum pressure of the liquid delivered by the pump 68.

The high pressure delivery pipe 78 is connected through a pipe 80 and a normally open shutoff valve 81 to an adjustable choke 82 which has a check valve 83 connected in parallel therewith, and the choke 82 and the check valve 83 are connected by a pipe 84 to an annular port 85 in the valve 26.

The pipes 71 and 78 are connected to the valves 26ª and 26ᵇ in a similar manner and liquid is returned to the sump of the pump unit 25 from all three hydraulic circuits through a drain pipe 86.

When the machine is idle, the ports 73, 77 and 85 are closed by the plunger 87 of the valve 26, the delivery of the pump 68 is automatically reduced to substantially zero, and the liquid delivered by the pump 69 is discharged through the relief valve 74.

The plunger 87 is provided with an offset stem 88 for engagement with an offset stem 89 carried by an actuating piston 90 which is arranged in the upper end of the valve cylinder and connected to the actuating stem 29.

When the lever 27 is operated, the roller 32 is swung away from an inclined cam face 91 on the cam 34, and roller 33 is swung against a face 92 which is parallel to the path of the carriage 10, and the valve plunger 87 is moved to its uppermost position, as shown in Fig. 5, by the offset stems 88 and 89.

The upward movement of the valve plunger 87 causes liquid to be drawn into the bottom of the valve cylinder from the drain pipe 86 through a pipe 93, a check valve 94 and a pipe 95. An adjustable low pressure resistance valve 96 is connected in parallel with the check valve 94 to allow liquid to be expelled from the bottom of the valve cylinder into the drain pipe when the valve plunger is lowered. Thus, liquid flows freely into the valve cylinder but is expelled therefrom against a predetermined pressure which is utilized for supporting the valve plunger 87 in selected positions.

The port 77 is now in registry with an annular groove 97 which is formed in the valve plunger 87 and connected by a passageway 98 with another groove 99 which is now in registry with an annular port 100. A pipe 101 has one end connected to the valve 26 in communication with the port 100 and its other end connected to a large capacity adjustable choke 102 and to the outlet of a check valve 103 which is connected in parallel with the choke 102. The outlet of the choke 102 and the inlet of the check valve 103 are connected by a pipe 104 to the rear end of the motor 24.

The forward end of the motor 24 is connected by a pipe 105 to a large capacity adjustable choke 106 and to the inlet of a check valve 107 which is connected in parallel with the choke 106. The inlet of the choke 106 and the outlet of the check valve 107 are connected by a pipe 108 to an annular port 109 which is formed in the valve 26 and registers at this time with an annular groove 110 formed in the plunger 87.

The groove 110 is connected by a passageway 111 to a groove 112 which at this time is in registry with an annular port 113 formed in the valve cylinder. A pipe 114 has one of its ends connected to the valve 26 in communication with the port 113 and its other end connected to the inlet of an adjustable low pressure resistance valve 115, the outlet of which is connected by a pipe 116 to the drain pipe 86.

Liquid from the gear pump 69 may now flow through the pipes 71 and 72, the check valve 75, the pipe 76, the port 77, the groove 97, the passageways 98, the groove 99, the port 100, the pipe 101, the choke 102, and the pipe 104 to the rear end of the motor 24 to advance its piston 23 and the carriage 10 at rapid traverse speed.

The carriages 16 and 21 may also be advanced at the same time as the choke 102 limits the volume of liquid delivered to its motor and the gear pump 69 should have sufficient volumetric capacity to operate all of the motors at rapid traverse speed simultaneously.

The liquid in the forward end of the motor 24 is expelled through the pipe 105, the check valve 107, the pipe 108, the port 109, the groove 110, the passageway 111, the groove 112, the port 113, the pipe 114, the resistance valve 115 and the pipe 116 to the drain pipe 86.

At the end of a predetermined forward movement of the carriage 10, for instance, just before the drills 7 engage the work, the cam roller 33 rides downward along a cam face 117 on the cam 34 and then engages a face 118 which is parallel to the path of the carriage 10 and of a length corresponding to the distance which the drills 7 are to be advanced at the feeding rate.

As the cam roller 33 moves along the cam face 117, it swings the lever 27 to depress the piston 90, the downward movement of which causes liquid to be drawn through a pipe 119 into the upper end of the valve 26 from the drain pipe 86.

The space between the piston 90 and the upper end of the plunger 87 is open to the drain pipe 86 through a pipe 120, the pipe 114, the resistance valve 115 and the pipe 116 and, as previously described, the lower part of the valve 26 is open to the drain pipe 86 through the pipe 95, the resistance valve 96 and the pipe 93.

However, the resistance of the valve 96 is considerably greater than the resistance of the valve 115 so that the liquid in the lower part of the valve 26 supports the plunger 87 and liquid is expelled from between the piston 90 and the upper end of the plunger 87 through the pipes 120 and 114, the resistance valve 115 and the pipe 116 until the stem 89 engages the plunger 87 and moves it downward. Liquid is then forced from the lower part of the valve 26 against the resistance of the valve 96 until the cam roller 33 rides onto the face 118, at which time the plunger 87 is in the position shown in Fig. 6.

In this position, the valve plunger 87 closes the port 77 to interrupt the delivery of liquid from the gear pump 69 to the motor 24 and high pressure liquid from the variable delivery pump 68 flows through the pipe 78, the valve 81, the pipe 80, the choke 82, the pipe 84, the port 85, the groove 97, the passageway 98, the groove 99, the port 100, the pipe 101, the choke 102 and the pipe 104 to advance the motor piston 23 and the carriage 10 at the feeding rate, and the liquid expelled from the front end of the motor 24 continues to flow into the drain pipe 86 through the channel previously described.

The choke 82 is adjustable to vary the rate of delivery of liquid to its motor and, by limiting the volume of liquid delivered thereto, it enables the pump 68 to deliver liquid to the other motors to operate them at their predetermined feeding rates.

As the carriage 10 approaches the limit of its forward movement, the cam roller 33 rides downward along a cam face 121 on the cam 34 and swings the lever 27 to depress the piston 90 and the plunger 87 until a port 122 in the valve casing is uncovered by the plunger 87.

Liquid from the gear pump 69 then flows through the pipes 71 and 72, a pipe 123 and the port 122 into the space between the piston 90 and the upper end of the plunger 87 to force the plunger 87 downward to its lowermost position, as shown in Fig. 7.

In this position, ports 73, 100, 109 and 113 are uncovered and liquid from the gear pump 69 flows through pipes 71 and 72, the port 73, the passageway 111, the port 109, the pipe 108, the choke 106, and the pipe 105 to the forward end of the motor 24 to retract the carriage 10 at rapid traverse speed. Liquid in the rear end of the motor 24 is exhausted through the pipe 104, the check valve 103, the pipe 101, the port 100, the passageway 98, the port 113, the pipe 114, the resistance valve 115 and the pipe 116 to the drain pipe 86.

As the carriage 10 approaches the limit of its rearward movement, the cam roller 32 rides downward along the cam face 91 and swings the lever 27, thereby raising the plunger 87 until it is in its neutral position, as shown in Fig. 8.

The port 122 is now uncovered and the piston 90 and the plunger 87 are kept spaced apart by gear pump pressure, and the ports 73, 77 and 85 are closed to prevent the delivery of liquid from either pump to the motor.

In order that tapping, or other work which requires a light feeding force, may be performed by one motor without affecting the feeding forces required by the other motors, a pipe 124 has one end connected to the pipe 104 and its other end connected to the inlet of a normally closed shutoff valve 125, the outlet of the valve 125 is connected to the inlet of an adjustable low pressure resistance valve 126, and the outlet of the valve 126 is connected to the drain pipe 86 by a pipe 127.

When the shutoff valve 125 is opened and the resistance valve 126 is adjusted to open at the desired pressure, liquid in excess of the volume required to produce the desired feeding force will be discharged through the resistance valve 126 into the drain pipe 86, and the choke 102 will limit the volume of liquid consumed by the motor so that the pressure of the liquid in the other motors is unaffected.

The motor 24 may also be operated solely by liquid delivered from a single source by directing liquid from that source through the small capacity choke 82 to advance the piston 23 at the feeding speed and also to direct liquid from the same source through the large capacity chokes 102 and 106 to advance and retract the piston 23 at rapid traverse speed.

Considering the pipe 72 as the source of liquid, by closing the shutoff valve 81 and opening a normally closed shutoff valve 128 which is connected to the pipe 80 by a pipe 129 and to the pipe 72 by a pipe 130, the liquid delivered from the pipe 72 through the resistance valve 75, the pipe 76, the valve 26, the pipe 101, the choke 102 and the pipe 104 to the motor 24 will advance the piston 23 at rapid traverse speed; the liquid delivered from the pipe 72 through the pipe 130, the valve 128, the pipe 129, the pipe 80, the choke 82, the pipe 84, the valve 26, the pipe 101, the choke 102 and the pipe 104 to the motor 24 will advance the piston 23 at the feeding speed; and the liquid delivered from the pipe 72 through the valve 26, the pipe 108, the choke 106 and the pipe 105 will retract the piston 23 at rapid traverse speed.

A number of motors may thus be operated simultaneously from a single pump or other source but a pump unit 25 of the character described is preferably employed as a relatively small volume of liquid is ordinarily required at high pressure to operate the motor at feeding speed and a relatively large volume of liquid is required to operate it at rapid traverse speeds.

Whenever one of the motors will operate under a low feeding pressure and there is a heavy demand upon the pump 68 by the other motors, or when a high feeding pressure in that motor would be objectionable, the valves 81 and 128 in the hydraulic circuit of that motor may be operated to use liquid from the gear pump 69 for operating the motor at its feeding rate.

Also, the flow of liquid to the motors may be restricted by employing piping of the required diameter or by employing fixed chokes. However, the chokes 82, 102 and 106 are preferably employed in order to regulate the speed of the motors and to provide for the use of driving liquids of different viscosity.

The valve plunger 87 is supported in its several positions by hydraulic pressure and, instead of employing a unitary cam 34 having a series of cam faces, a separate cam may be provided for each movement of the valve plunger 87, as shown in Fig. 9, in which cams 131, 132 and 133 are shown secured in selected positions upon a bar 134 carried by the carriage 10, and the movement of the lever 27 is limited by stops 135 and 136.

The cam face 91 is formed on the cam 131, the cam face 117 is formed on the cam 132, the cam face 121 is formed on the cam 133, and the cams may be spaced apart according to the distances which the carriage 10 moves at the rapid traverse and the feeding speeds.

The invention herein set forth is susceptible of various modifications and adaptations without departing from the scope thereof as hereafter claimed.

The invention is hereby claimed as follows:

1. The combination, with a hydraulic motor, of a feed pump for delivering liquid to said motor to operate it at slow speeds, a larger capacity pump for delivering liquid to said motor to operate it at faster speed, means connecting said pumps to said motor including a limited capacity choke arranged between said feed pump and said motor and a larger capacity choke arranged between the other pump and said motor for limiting the volume of liquid delivered to said motor whereby a part of the delivery of each pump is made available for other uses, a relief valve connected to said large pump for limiting the pressure created thereby and permitting the exhaust of liquid delivered by said pump in excess of requirements, a control valve connected into said connecting means for directing liquid from either pump to said motor to thereby control the speed and direction of motor actuation, and means responsive to movement produced by said motor for operating said valve.

2. The combination, with a hydraulic motor, of a feed pump for delivering liquid to said motor to operate it at slow speeds, a larger capacity pump for delivering liquid to said motor to operate it at faster speed and for delivering liquid to said feed pump to supercharge it, means connecting said pumps to said motor including a limited capacity choke arranged between said feed pump and said motor and a larger capacity choke arranged between the other pump and said motor for limiting the volume of liquid delivered to said motor whereby a part of the delivery of each pump is made available for other uses, a relief valve connected to said large pump for limiting the pressure created thereby and permitting the exhaust of liquid delivered by said pump in excess of requirements, a control valve connected into said connecting means for directing liquid from either pump to said motor to thereby control the speed and direction of motor actuation, and means responsive to movement produced by said motor for operating said valve.

3. The combination, with a plurality of hydraulic motors, of a feed pump for delivering liquid to said motors to operate the same at slow speeds, a larger capacity pump for delivering liquid to said motors to operate the same at faster speed, means connecting said pumps to said motors including a limited capacity choke arranged between said feed pump and each motor and a larger capacity choke arranged between the other pump and each motor for limiting the volume of liquid delivered to that motor whereby a part of the delivery of each pump may be delivered simultaneously to each motor, a relief valve connected to said large pump for limiting the pressure created thereby and permitting the exhaust of liquid delivered by said pump in excess of requirements, a control valve connected to each motor for directing liquid thereto from either pump to thereby control the speed and direction of motor actuation, means responsive to movement produced by each motor for operating the valve connected thereto, a relief valve connected to one of said motors to limit the pressure of the liquid delivered thereto, and a shutoff valve arranged between said relief valve and said motor.

4. The combination, with a plurality of hydraulic motors, of a feed pump for delivering liquid to said motors to operate the same at slow speeds, a larger capacity pump for delivering liquid to said motors to operate the same at faster speed and for delivering liquid to said feed pump to supercharge it, means connecting said pumps to said motors including a limited capacity choke arranged between said feed pump and each motor and a larger capacity choke arranged between the other pump and each motor for limiting the volume of liquid delivered to that motor whereby a part of the delivery of each pump may be delivered simultaneously to each motor, a relief valve connected to said large pump for limiting the pressure created thereby and permitting the exhaust of liquid delivered by said pump in excess of requirements, a control valve connected to each motor for directing liquid thereto from either pump to thereby control the speed and direction of motor actuation, means responsive to movement produced by each motor for operating the valve connected thereto, a relief valve connected to one of said motors to limit the pressure of the liquid delivered thereto, and a shutoff valve arranged between said relief valve and said motor.

5. The combination, with a machine having a movable carriage, a hydraulic motor having its piston connected to said carriage for advancing and retracting the same and a pump for delivering liquid to said motor to operate the same, of means for controlling the operation of said motor comprising a choke connected between said pump and said motor for limiting the volume of liquid delivered to said motor whereby a part of the delivery of said pump is made available for other uses, a valve cylinder connected to said pump and to said motor, a plunger arranged in said cylinder for controlling the delivery of liquid from said pump to said motor, an offset stem carried by said plunger, an actuating piston arranged in said cylinder and having an offset stem for engaging said plunger and the offset stem thereof, a cam carried by said carriage and movable therewith, and a cam lever operated by said cam and connected to said piston for operating the same.

6. The combination, with a machine having a movable carriage, a hydraulic motor having its piston connected to said carriage for advancing and retracting the same, a large capacity pump for delivering liquid to said motor to operate the same at rapid traverse speed and a smaller capacity pump for delivering liquid to said motor to operate the same at slow speed, of means for controlling the operation of said motor comprising a choke connected between each pump and said motor for limiting the volume of liquid delivered to said motor whereby a part of the delivery of said pumps is made available for operating other hydraulic motors, a plunger valve having ports connected to said pumps and said motor for directing liquid from said pumps to said motor and a port connected to one of said pumps for admitting liquid into said valve to operate its plunger, a valve actuator carried by said machine and responsive to the movement of said carriage for operating said valve, and means including a lost motion joint for connecting said actuator to the plunger of said valve.

7. The combination, with a machine having a movable carriage, a hydraulic motor having its piston connected to said carriage for advancing and retracting the same, a large capacity pump for delivering liquid to said motor to operate the same at rapid traverse speed and a limited capacity pump for delivering liquid to said motor to operate the same at slow speed, of means for controlling the operation of said motor comprising a choke connected between each pump and said motor for limiting the volume of liquid delivered to said motor whereby a part of the delivery of said pumps is made available for other uses, a valve cylinder having ports connected to said pumps and to said motor, a plunger arranged in said cylinder for controlling said ports and thereby controlling the delivery of liquid from said pumps to said motor, a cam lever for operating said plunger, means connecting said lever to said plunger and having a lost motion joint between the same, means for actuating said cam lever and thereby operating said plunger to cause liquid to be directed from said large capacity pump to said motor to advance said carriage at rapid traverse speed, a cam carried by said carriage and movable therewith, a face on said cam for engaging said cam lever to actuate the same and thereby operate said plunger to cause the delivery of liquid from said large capacity pump to said motor to be interrupted and to cause liquid from said limited capacity pump to be delivered to said motor to advance said carriage at slow speed, a cam face on said cam for engaging said cam lever to actuate the same and thereby operate said plunger to interrupt the delivery of liquid from said limited capacity pump to said motor and to uncover a port in said cylinder to admit thereto liquid from said large capacity pump to force said plunger to its rapid traverse position and thereby cause liquid to be delivered from said large capacity pump to said motor to cause said carriages to be retracted at rapid traverse speed, and another cam face on said cam for engaging said cam lever to actuate the same and thereby move said plunger to its neutral position to interrupt the delivery of liquid to said motor.

WALTER FERRIS.
GLEN MACOMBER.